(12) United States Patent
Oujamaa (10) Patent No.: US 11,618,587 B2
(45) Date of Patent: Apr. 4, 2023

(54) GROUND MANEUVER ASSISTANCE SYSTEM FOR AIRCRAFT

(71) Applicant: Mohamed Oujamaa, Rabat (MA)

(72) Inventor: Mohamed Oujamaa, Rabat (MA)

( * ) Notice: Subject to any disclaimer, the term of this patent is extended or adjusted under 35 U.S.C. 154(b) by 408 days.

(21) Appl. No.: 17/298,735

(22) PCT Filed: Dec. 28, 2018

(86) PCT No.: PCT/IB2018/060674
§ 371 (c)(1),
(2) Date: Jun. 1, 2021

(87) PCT Pub. No.: WO2019/130251
PCT Pub. Date: Jul. 4, 2019

(65) Prior Publication Data
US 2022/0055769 A1    Feb. 24, 2022

(30) Foreign Application Priority Data
Dec. 29, 2017 (LU) .......................... 100634

(51) Int. Cl.
*B64F 1/10*    (2006.01)

(52) U.S. Cl.
CPC ...................... *B64F 1/10* (2013.01)

(58) Field of Classification Search
CPC ............ B64F 1/10; B64F 1/002; B64F 1/007
See application file for complete search history.

(56) References Cited

U.S. PATENT DOCUMENTS

| | | | | |
|---|---|---|---|---|
| 1,803,320 | A * | 5/1931 | Christianson | B64F 1/10 414/537 |
| 4,653,706 | A * | 3/1987 | Ragiab | B64F 1/10 405/1 |
| 6,394,391 | B1 * | 5/2002 | Lo | B64F 1/10 244/116 |
| 6,695,255 | B1 * | 2/2004 | Husain | B64F 1/10 244/110 E |
| 9,376,218 | B2 * | 6/2016 | Al Fadhli | B64F 1/0297 |

(Continued)

FOREIGN PATENT DOCUMENTS

| | | |
|---|---|---|
| DE | 3034014 A1 | 4/1982 |
| DE | 4102861 A1 | 8/1992 |

(Continued)

OTHER PUBLICATIONS

International Search Report for corresponding application PCT/IB2018/060674 filed Dec. 28, 2018; dated Apr. 2, 2019.

(Continued)

*Primary Examiner* — Justin M Benedik
(74) *Attorney, Agent, or Firm* — Cantor Colburn LLP (57) ABSTRACT

A ground maneuver assistance system for aircraft, more particularly for airplanes, the system including a carriage driven on a track by a drive means, the speed of which can be matched to a landing or takeoff speed of the airplane, the carriage including a chassis configured to move on the track; a movable platform configured to support the airplane; and means for connecting the platform to the chassis, which means are configured to establish relative movement between the platform and the chassis, and the platform including coupling means configured to grip and release the airplane.

19 Claims, 4 Drawing Sheets

(56) References Cited

U.S. PATENT DOCUMENTS

| | | | | |
|---|---|---|---|---|
| 9,862,503 | B2* | 1/2018 | Chavez, Jr. | B64F 1/029 |
| 10,040,576 | B1* | 8/2018 | Rosenberg | B64D 45/08 |
| 10,822,118 | B2* | 11/2020 | Rosenberg | B64D 47/02 |
| 2017/0137150 | A1* | 5/2017 | Conyers | B64F 1/007 |
| 2022/0089294 | A1* | 3/2022 | Bi | B64C 25/68 |

FOREIGN PATENT DOCUMENTS

| | | |
|---|---|---|
| EP | 1935785 A1 | 6/2008 |
| FR | 2990929 A1 | 11/2011 |
| WO | 2009135472 A2 | 11/2009 |
| WO | 2010061384 A2 | 6/2010 |

OTHER PUBLICATIONS

Written Opinion of the International Searching Authority for corresponding application PCT/IB2018/060674 filed Dec. 28, 2018; dated Apr. 2, 2019.

\* cited by examiner

GROUND MANEUVER ASSISTANCE SYSTEM FOR AIRCRAFT

TECHNICAL FIELD

The present disclosure relates in general to the field of ground equipment for assisting aircraft. The present disclosure relates more specifically to a ground maneuver assistance system for aircraft, and in particular for aeroplanes.

BACKGROUND

The air transport sector has experienced phenomenal levels of development over the last century. Aircraft, and in particular aeroplanes have today become an instrument of universal economic and human development which cannot be ignored. However, this means of transport still faces major challenges, for example with regard to the safety thereof or reducing operating costs.

Aviation safety has improved greatly over the last decades. The analysis carried out after each accident enables others to be prevented by contributing to the improvement of aircraft design, manufacturing, maintenance and operation processes.

However, those accidents which do occur remain dramatic and result in large numbers of victims. The causes of such accidents include the following: meteorological conditions, such as snow, black ice, or fog; bursting of one or more tires of the landing gear; a mechanical malfunction; or indeed human error.

It is noted that the vast majority of aviation accidents occur during take off or landing, and that many of these accidents occur on the ground. Periods when an aeroplane is being maneuvered along the ground or in the immediate vicinity of the ground are the most critical.

During the landing phase, problems may be encountered when the aeroplane does not manage to stabilize its trajectory or its position and adopts an orientation and/or a direction which is not parallel to that of the runway.

In aircraft development, research is therefore being carried out not only into improving energy and wear performance, but also into improving flight safety during the periods involving contact with the ground.

Solutions are known from the prior art, such as, for example in document FR 2990929, which implements a platform on which an aeroplane may touch down. The platform comprises a radar and a positioning beacon for synchronizing it with maneuvering of an aeroplane during landing. The platform is mobile thanks to motors supplied with electrical energy, and a system of steel wheels travelling on rails. The system incorporates safety devices such as a net for holding an aeroplane.

This type of system is advantageous, because it makes it possible to reduce the cost of fuel consumed by the aeroplane during take off and landing. It also makes it possible to prevent problems associated with malfunctioning of the landing gear. On the other hand, this system does not allow correction of bad positioning of the aeroplane during landing phases, nor does it ensure maneuvering of the aeroplane on the ground.

Another ground assistance device is described in the document published under number DE 3034014. This document describes a platform on which an aeroplane may touch down or take off. The platform is here moved by a wheeled vehicle. The platform is supported by actuators which allow it to be inclined to orient it in the direction of the aeroplane on take off or landing.

This type of platform has an additional advantage in that it is better adapted to the position of the aeroplane during landing. On the other hand, the system described here is intended for aeroplanes designed without landing gear. It is thus not suitable for the majority of aeroplanes currently in circulation.

Another example of the prior art is found in document EP 2282938. This document proposes an assistance device for take off, landing and parking of an aeroplane. The device is propelled by magnetic induction.

This device is also configured to replace the landing gear of an aeroplane and is not suitable for current aeroplanes. This device does not address the issue of compensating for bad positioning of the aeroplane on landing. On the other hand, this device does address the issue of parking the aeroplane away from the runway.

Finally, a last example may be found in document EP 1935785. This document proposes a device for assisting an aeroplane with take off and landing. The device is propelled by magnetic induction.

This last device presents the same drawbacks as the previous one, except that it can be adapted to an aeroplane comprising landing gear.

BRIEF SUMMARY

The disclosure aims to remedy the drawbacks of the prior art by providing a ground assistance system which enables aircraft performance and safety to be improved during maneuvering phases involving contact with the ground, and which may be adapted to all types of aeroplane.

More particularly, the disclosure proposes a ground maneuver assistance system for aircraft, more particularly for aeroplanes, said system comprising a carriage driven on a runway by a drive means, the speed of which may be adapted to a landing or take off speed of the aeroplane. The carriage comprises a chassis configured for maneuvering on the runway; a mobile platform configured to support the aeroplane; and means for connecting the platform to the chassis, configured to create relative movement between the platform and the chassis. The platform comprises coupling means configured to engage and release the aeroplane.

According to the disclosure, the connection means enable translational maneuvering of the platform, in at least one vertical direction and one transverse direction relative to the travel of the carriage. The connection means also allow rotation of the platform in space along three perpendicular axes of rotation, so as to orient the platform in a plane corresponding to the take off or landing angle of the aeroplane.

Within the scope of the disclosure, maneuvering of an aircraft on the ground will be considered to be all the maneuvering phases of the aircraft involving contact with the ground. Maneuvering on the ground thus includes take off, landing, parking or taxiing on the ground.

Translation of the platform in a transverse direction relative to the travel of the carriage makes it possible to place the platform under an aeroplane during landing, even if it is not aligned with the runway. Rotational orientation of the platform makes it possible to bring the platform into contact with the aeroplane when the latter is oriented in an unconventional plane at the time of landing.

When landing, the ground assistance system according to the disclosure is capable of moving in close under an aeroplane, of maneuvering the platform to the level of the aeroplane in flight and of engaging it. During take off, the system makes it possible to propel and accompany the aeroplane.

The aeroplane is taken care of physically in all its maneuvers up to a predetermined distance from the ground. The system eliminates the risks of accident due to a malfunction of the landing gear such as, for example bursting tyres. This also makes it possible to reduce wear to the landing gear, which is not used when the aeroplane is being maneuvered within an airport equipped with the system according to the disclosure.

The system according to the disclosure also permits elimination of some of the onboard systems in the aeroplane which serve only in take off and landing, such as, for example the landing gear or the ground braking and steering systems.

Moreover, the system relieves aircraft crew of the pressure and stress associated with take off and landing procedures.

Advantageously, the carriage is linked removably to the drive means. For example, the carriage may be hauled or pushed by a locomotive. In these embodiments, the drive means may be used to drive a plurality of carriages corresponding to different types of aircraft. The drive means may be allocated to one carriage when another one is parked, in order to optimize use thereof. Another advantage is simplification of maintenance operations, which will not require a carriage to be immobilized.

The drive means preferably comprise an electric locomotive which pushes or hauls the carriage. As soon as the aeroplane is engaged by the assistance system, the aeroplane can thus cut its engines. The atmospheric pollution associated with burning fossil fuels is reduced owing to the use of electrical energy. This also makes it possible to reduce noise nuisance because electric motors are quieter than, for example, jet engines.

Another advantage of electric propulsion is the absence of a fuel storage tank in the system, so meaning less weight has to be maneuvered and there are fewer risks of ignition or explosion in the event of an accident.

In advantageous embodiments, the system further comprises rails installed on the runway, and the chassis of the carriage travels on the rails. The use of rails which define the runway and the paths taken by the system reduces the risk of collisions on the ground, by imposing one-way systems, for example. Taxiing by rail also makes it possible to build runways on low-grade or uneven land.

The carriage is preferably driven by magnetic induction. Transport by magnetic induction allows the carriage to reach a high speed over a relatively short distance. The length of the runway is thus reduced relative to a traditional runway.

Advantageously, the connection means comprise at least one onboard rail, and a system allowing the platform to be transported on the onboard rail, translationally in a transverse direction relative to the travel of the carriage. The onboard rail on the carriage allows more precise maneuvering which may be implemented with solutions comprising simple, known motors.

Advantageously, the connection means comprise at least three hydraulic or pneumatic actuators connected to the platform at three separate points and allowing rotational orientation of the platform. The use of actuators allows simple implementation with known systems which provides sufficient robustness for supporting a passenger aeroplane.

In preferred embodiments, the connection means comprise a bearing of the horizontal slewing type which permits rotation of the platform about a vertical axis. Slewing bearings are bearings arranged to support heavy axial loads by allowing precise rotational movements.

Advantageously, the connection means further comprise a vertical transmission shaft connected to the platform by a ball joint coupling, configured to control vertical translational motion of the platform. In addition to providing simply implemented vertical translational motion, the transmission shaft improves the rigidity of the system The connection means preferably comprise one or more shock-absorbing means. The shock-absorbing means enter into effect on contact between the aeroplane and the platform at the time of landing. They ensure better landing comfort and reduce the risk of impacts which could result in material damage or premature wear to the components of the aeroplane.

In some embodiments, the coupling means are capable of engaging and releasing the landing gear of the aeroplane and/or an aeroplane fuselage component. The system may engage the landing gear of conventional aeroplanes, or another component for aeroplanes specially designed without landing gear. The system may also be configured to engage the aeroplane directly on the fuselage if the landing gear has failed to deploy.

In preferred embodiments, the system further comprises an emergency vehicle which transports assistance tools in the event of an accident or fire. The emergency vehicle is immediately present on the scene in the event of an accident at the point of landing or take off Any required intervention is rapid and contributes to improving the safety of any passengers.

The carriage preferably further comprises means of supplying electrical energy to the aircraft. The aircraft then has the possibility of making use of the electricity supply of the platform to save or recharge its batteries.

Advantageously, the system further comprises a control module which can be controlled remotely to maneuver the carriage and/or orient the platform. The personnel on the ground may then control start of the aeroplane from a control centre common to a plurality of carriages.

According to preferred embodiments, the system is capable of transporting the aeroplane to and from a parked position. The system thus allows the aircraft to be assisted in all its ground maneuvers. The aeroplane no longer needs motive means on the ground.

Another aspect of the disclosure relates to a method of ground assistance for landing an aircraft, more particularly an aeroplane, having a system according to the disclosure, the method comprising the steps of:
- placing the carriage at the end of the runway with the connection means in the initial position with the platform horizontal;
- accelerating the carriage in a straight line up to a speed corresponding to the landing speed of the aeroplane;
- matching the carriage's speed to that of the aeroplane;
- controlling the connection means so as to maneuver the platform under the aeroplane;
- controlling the connection means so as to bring the coupling means into contact with the corresponding components of the aeroplane;
- gripping the aeroplane with the coupling means;
- controlling the connection means in the initial position, so as to place the aeroplane on a horizontal plane;
- braking the aeroplane down to a taxiing speed on the runway.

The initial position of the connection means is a position in which the platform is horizontal and centered on the chassis. The initial position is a position arranged for taxiing of the carriage transporting an aeroplane. The initial position is preferably the position in which the carriage is the most compact, with minimum bulk.

Advantageously, the method further comprises the following step:

once the aeroplane has been braked down to a taxiing speed on the runway, parking the aeroplane by driving the carriage at the taxiing speed as far as a parking zone.

The parking zone may for example be a boarding zone, a deboarding zone, a shelter zone or a maintenance workshop.

Another aspect of the disclosure relates to a method of ground assistance for take off of an aircraft, more particularly an aeroplane, having a system according to the disclosure, the method comprising the steps of:

placing the carriage at the end of the runway with the connection means in the initial position, with the platform horizontal, and the aeroplane fixed to the coupling means;

accelerating the carriage in a straight line up to a speed corresponding to the take off speed of the aeroplane;

controlling the connection means so as to incline the aeroplane into the take off position;

once the take off speed has been reached, releasing the aeroplane using the coupling means.

Advantageously, the ground assistance method for take off of an aircraft further comprises the following step:

after take off of the aeroplane, continuing to maneuver the carriage under the aeroplane so as to be able to carry out landing in case of emergency.

If the aeroplane breaks down or suffers a problem which prevents it from completing take off and means that the aeroplane must return to the ground, the carriage is then still close by and it is possible to engage the aeroplane for an emergency landing. This step is a supplementary safety measure.

In general, and beyond the particular advantages already mentioned with regard to safety, major benefits of the present disclosure are in particular the significant fuel savings (engines turned off from touch down to take off), the very significant reduction in atmospheric and noise pollution and benefits with regard to maintenance.

BRIEF DESCRIPTION OF THE FIGURES

Other details and features of the disclosure will emerge from the following detailed description of at least one advantageous embodiment, provided by way of illustration with reference to the appended drawings, in which.

DETAILED DESCRIPTION

The ground maneuver assistance system for aircraft is described here for the assistance of aeroplanes of the airliner type for passenger transport, but it could be adapted to ground assistance for other types of aircraft.

Figure 3:
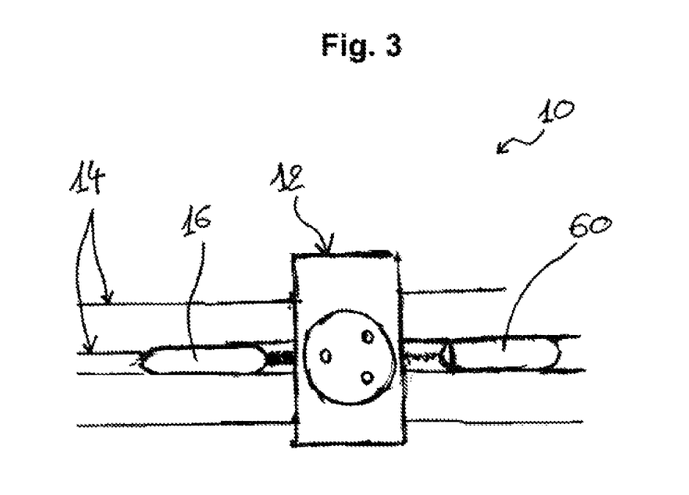
FIG. 3 is a schematic representation of a view from above of a preferred embodiment of a ground maneuver assistance system according to the disclosure.

The ground assistance system 10 shown in FIG. 3 comprises a carriage 12 configured for maneuvering on a runway comprising rails 14. It will be understood that the runway is not limited to a rail track but may be any type of surface enabling maneuvering of the carriage The carriage 12 is driven by a drive means. Any appropriate drive means may be used to drive the carriage, for example, the drive means may be an engine/motor integrated into the carriage 12. The drive means here is a locomotive 16, coupled to the carriage 12. The locomotive 16 enables hauling of the carriage 12 at a variable speed which may be adapted to the landing or take-off speed of the aeroplane. A locomotive provided with an electric motor is preferred.

Figure 1:
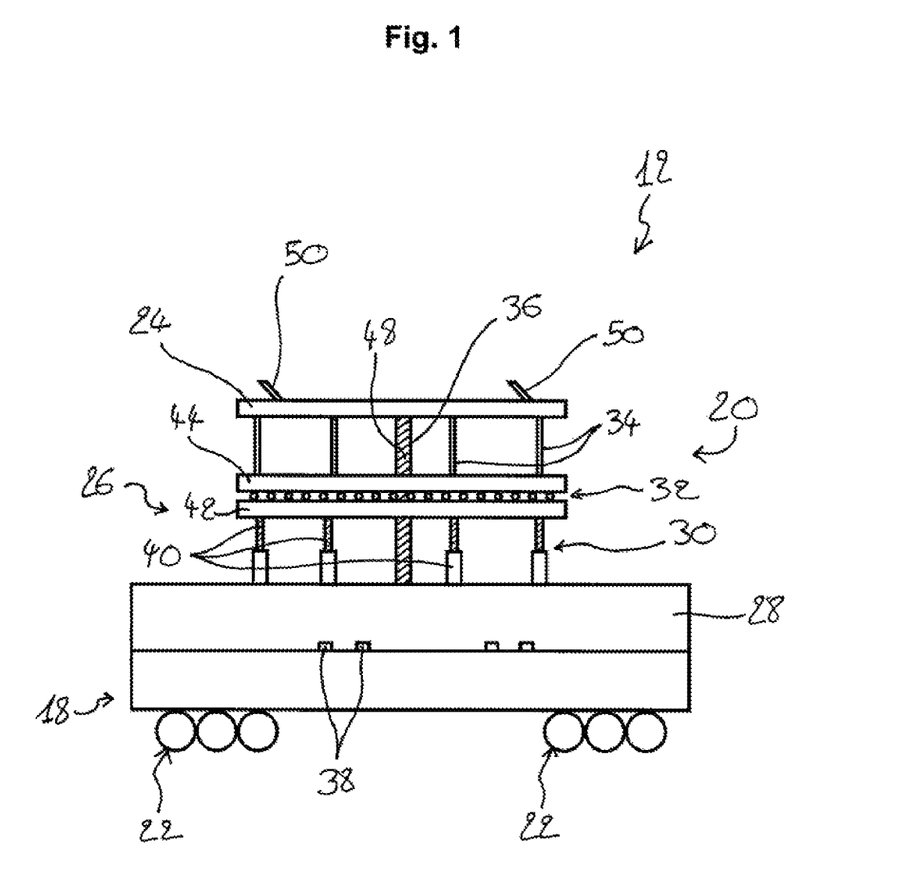
FIG. 1 is a schematic representation of a side view of a preferred embodiment of the carriage of a ground maneuver assistance system according to the disclosure.

The carriage 12 comprises a chassis 18 supporting a platform 20, shown in FIG. 1. The chassis 18 rests on the runway and forms an interface between the platform and the runway. The width of the chassis 18 may be at least equal to that of a conventional landing strip, without however covering up any ground lighting.

The chassis 18 here comprises two bogies 22 shown schematically by wheels in FIG. 1 and which allow the chassis to travel on the rails 14. The bogies 22 are equipped with brakes (not shown).

The role of the platform is to engage or release the aeroplane depending on whether it is landing or taking off. According to one important aspect of the disclosure, the platform 20 is mobile relative to the chassis 18 supporting it, so as to be able to arrange itself in a plane parallel the plane of the aeroplane in flight at the moment of landing, and so as to orient the aeroplane at the moment of take-off. The platform 20 may thus be maneuvered in a vertical direction and a transverse direction relative to the travel of the carriage, and the platform 20 may be set in rotation relative to the chassis according to three perpendicular axes of rotation.

Since the platform 20 is intended to carry the aeroplane, the components of the platform are dimensioned to withstand the forces exerted by an aeroplane in a take-off, landing or parking phase.

The platform 20 comprises an upper deck 24, and mobile connection means 26 which link the upper deck 24 to the chassis 18.

The connection means 26 comprise, between the chassis 18 and the upper deck 24, a lower deck 28, an actuator assembly 30, a bearing 32, articulated connecting rods 34 and a transmission shaft 36. The arrangement of the various components will here be presented starting with the chassis 18 and progressing upwards to the upper deck 24, but other arrangements are conceivable.

The lower deck 28 is a square deck which rests on the chassis 18. The lower deck 28 here covers the chassis 18, but other shapes or dimensions of the lower deck 28 may be envisaged.

The lower deck 28 and the chassis 18 are linked together by onboard rails 38. The rails 38 are oriented in a direction perpendicular to that of the bogies 22, that is to say in a transverse direction relative to the travel of the carriage. The lower deck 28 comprises wheels mounted on the onboard rails 38 and one or more motors (not shown) which allow the wheels to be driven and the lower deck 28 to be maneuvered in the two directions along the rails 38.

The lower deck 28 supports the actuator assembly 30. The actuator assembly 30 comprises a plurality of pneumatic or hydraulic actuators 40 mounted between the lower deck 28 and the bearing 32. Each actuator 40 is mounted fixedly on the lower deck 28 and connected for example by a ball joint coupling to the bearing 32.

The actuators 40 are connected to an onboard supply system (not shown) which is preferably mounted on the lower deck 28.

The actuator assembly 30 here comprises four actuators 40 disposed regularly in a circle, preferably concentrically with the lower deck 28. The actuator assembly 30 may comprise a different number of actuators 40, with a minimum of three actuators.

Each actuator 40 is individually actuatable with a respective control. Simultaneous action of the actuators 40 along different travel routes and/or directions makes it possible to modify the orientation of the plane of the bearing 32 relative to horizontal.

The regular arrangement of the actuators in a circle makes it possible easily to achieve inclination in given plane.

The bearing 32 is a ring bearing comprising two parallel flat annular plates: a fixed lower plate 42 and a mobile upper plate 44. The fixed plate 42 is linked to the actuator assembly 30.

The bearing 32 is a bearing of the slewing type which is not mounted on a shaft. It allows relative rotation of one plate relative to the other, according to an axis perpendicular to the plane defined by the actuator assembly 30.

Preferably, rotation of the two plates of the bearing 32 is ensured by a rotational drive means (not shown) such as for example a gear motor which drives internal pinions of the bearing.

The mobile plate 44 serves as a support for the upper deck 24 of the carriage. The mobile plate 44 and the upper deck 24 are linked by a plurality of articulated connecting rods 34 disposed regularly in a circle around the circumference of the mobile plate 44. The connecting rods 34 are mounted in ball joint couplings on both the upper deck 24 and the mobile plate 44. The connecting rods 34 enable transmission of the orientation of the bearing 32 to the upper deck 24.

The connection means 26 further comprise a transmission shaft 36 mounted vertically between the lower deck 28 and the upper deck 24. The transmission shaft 36 passes through the center of the ring bearing 32. The stroke of the actuators 40 is configured such that the transmission shaft never comes into contact with the bearing 32. The transmission shaft 46 is linked to the upper deck 24, for example, by a ball joint-type coupling which enables all rotations. The transmission shaft 36 comprises a thread 48 which passes through a tapped hole (not shown) in the lower deck 28.

The transmission shaft 36 may be set in rotation by a motor (not shown) included in the lower deck 28. Rotation of the transmission shaft 36 in the tapped hole causes said shaft to ascend or descend and also drives the upper deck 24.

The transmission shaft 36 also has the function of rigidifying the structure of the connection means 26.

Here the upper deck 24 a circular deck, although other shapes are conceivable. The upper deck 24 comprises coupling means 50 configured to engage and release the aeroplane.

Figure 2:
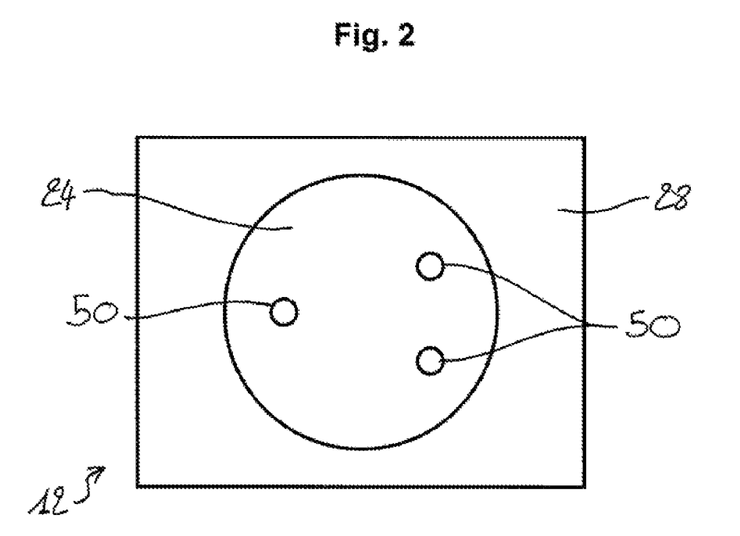
FIG. 2 is a schematic representation of a view from above of the system of FIG. 1.

The coupling means 50 are configured either for connection with conventional aeroplane landing gear, or for connection with predefined points of the fuselage or another part de the aeroplane or a combination of these solutions. All suitable coupling means may be used. As shown in FIG. 2, the deck 24 comprises three coupling means intended for connection to the three wheels of the aeroplane landing gear.

The upper deck 24 may also comprise beacon or lighting means to assist the aeroplane as it approaches.

The carriage 12 further comprises shock-absorbing means (not shown) which allow cushioning of any potential impact arising on coupling between the carriage and the aeroplane. These shock-absorbing means may be installed either in the chassis 18 or in another part of the carriage 12.

Figure 4:
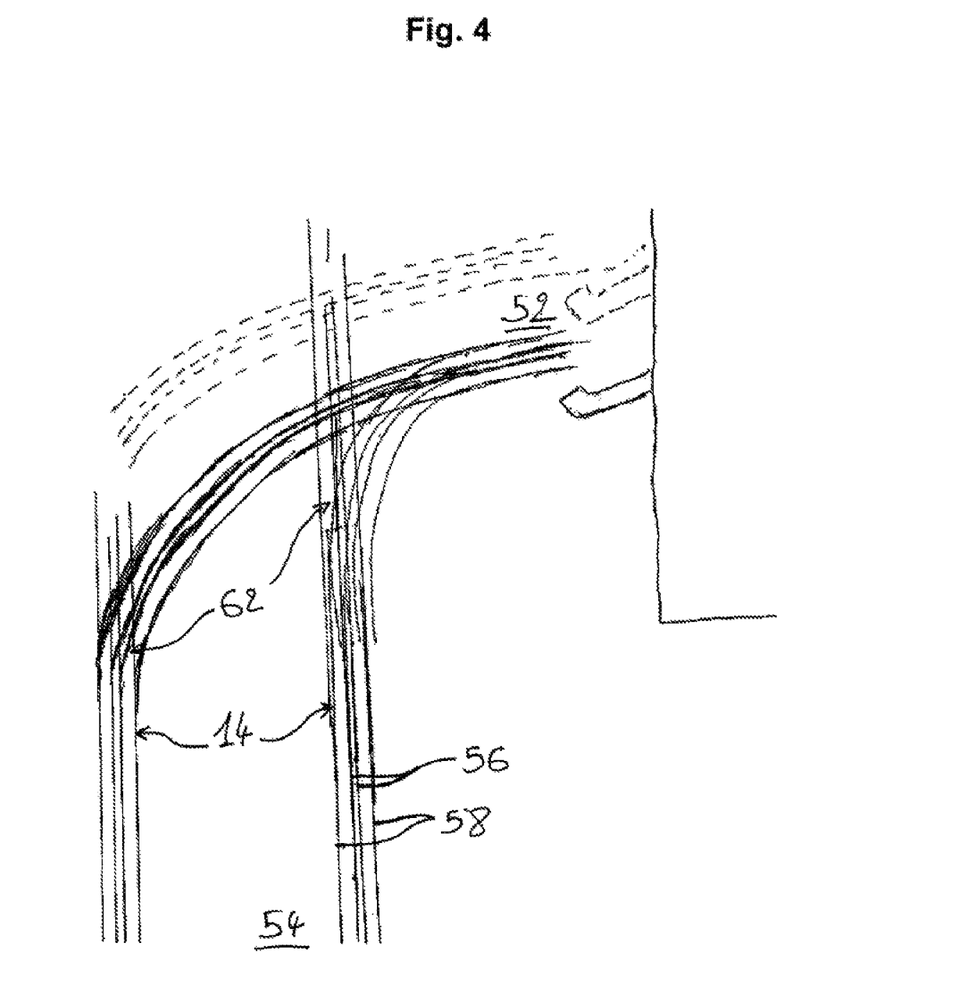
FIG. 4 is a view from above of an airport comprising one embodiment of a ground maneuver assistance system according to the disclosure.

As shown in FIG. 4, the ground assistance system 10 comprises a plurality of rails 14 which ensure guidance of the carriage from a parking zone 52 to the end of the take-off and landing runways 54. The rails 14 constitute tracks which communicate by points 62 so as to be able to provide a plurality of different taxiing options. One possibility for each trajectory is a pair of closer-together rails 56 for the locomotive 16 and a pair of further-apart rails 58 for the carriage 12.

Thanks to these different sets of rails, the locomotive 16 may haul the carriage 12 up to the parking zone 52 such as, for example, a deboarding zone, then be uncoupled and go to pick up another carriage carrying an aeroplane in a boarding zone to assist it with take-off. The locomotive 16 may serve as a drive system for a plurality of carriages.

The ground assistance system 10 may further include various systems which are not shown, including: positioning and synchronization means for the platform relative to an aeroplane in the landing phase, and a control module which may be controlled remotely for maneuvering the carriage and/or orienting the platform.

The system for example includes an onboard radar on the carriage; a computer, preferably onboard on the platform; means of communicating with the aeroplane; one or more positioning beacons, installed on the upper deck, and a detection system capable of locating the position and orientation of the components of the aeroplane capable of engaging the coupling means of the platform.

Advantageously, the system further comprises an emergency vehicle 60 hauled by the carriage and the locomotive, as shown in FIG. 3. The emergency vehicle transports assistance tools in case of an aeroplane accident or fire, such as for example fire hoses. The vehicle may also transport people such as firefighters.

Thus, in case of an accident during aeroplane take-off or landing, emergency assistance is immediately present in the vicinity of the aeroplane.

According to variant embodiments, the carriage 12 carries an electric generator and allows the aeroplane to be supplied with electricity while the latter is in contact with the platform.

Preferred embodiments of ground assistance methods for landing, take-off, and for parking of an aeroplane will now be described with reference to FIGS. 5a, 5b, 6a and 6b.

Figure 5A:
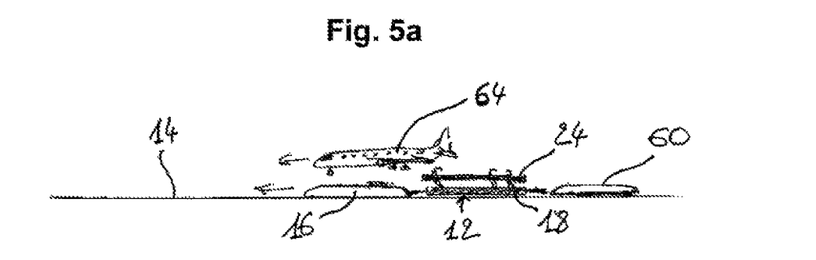
FIG. 5a is a side view of a step of a preferred embodiment of the ground assistance method for landing according to the disclosure comprising accelerating the carriage in a straight line up to a speed corresponding to the landing speed of the aeroplane.

Prior to landing of an aeroplane 64, the locomotive 16, the carriage 12 and the emergency vehicle 60 are positioned waiting at the end of the runway. The connections means 26 between the platform 20 and the chassis 18 of the carriage 12 are in an initial position in which the upper deck 24 is horizontal, at its lowest point, and substantially positioned above the center of the chassis 18.

As shown in FIG. 5a, on arrival of the aeroplane 64 the locomotive 16 accelerates along the runway in a straight line. The positioning beacons are activated, and the speed and the position of approach of the aeroplane 64 are evaluated.

The locomotive 16 sets the carriage 12 in motion at a speed corresponding to the speed of the aeroplane, in such a way as to position the carriage as close as possible to the aeroplane 64, the locomotive 16 then matching the speed of the carriage 12 to that of the aeroplane 64.

The connection means 26 between the platform 20 and the chassis 18 of the carriage are then controlled so as to maneuver the upper deck 24 under the aeroplane 64. This first stage is performed if necessary by maneuvering the lower deck 28 on the onboard rails 38 in a transverse direction relative to the travel of the carriage 12. Then, depending on the position and orientation of the aeroplane, the transmission shaft is set in rotation so as to raise the upper deck 24 to the height of the aeroplane 64, and/or the actuators 40 are controlled so as to orient the plane of the upper deck 24 of the platform 20 in the same plane as that formed by the three wheels of the landing gear of the aeroplane 64 and to bring the coupling means 50 into contact with the corresponding components of the aeroplane. During this phase, the aeroplane 64 may be kept at a constant speed and position above the runway, provided it is situated below a maximum assistance altitude corresponding to the maximum elevation of the upper deck 24.

Once the coupling means 50 have been brought into contact with the landing gear of the aeroplane 64, these are actuated so as to firmly engage the landing gear.

Figure 5B:
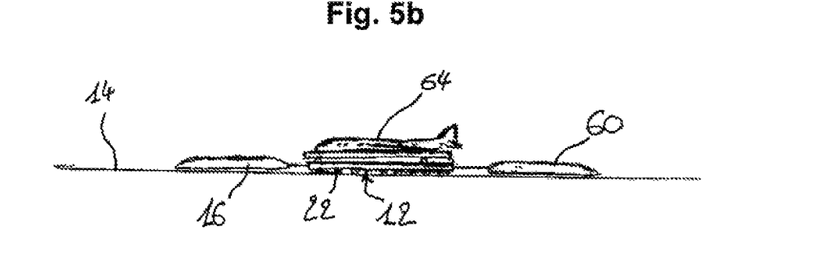
FIG. 5b is a side view of a step of the method of FIG. 5a comprising braking the aeroplane down to a taxiing speed on the runway.

As soon as coupling between the coupling means 50 and the landing gear has been made firmly secure, the connection means 26 between the platform 20 and the chassis 18 of the carriage 12 are returned to their initial position, carrying the aeroplane 64 with them, as shown in FIG. 5b. At this stage, the aeroplane 64 may cut its propulsion means and connect to the electrical power supply of the carriage 12.

Then the carriage 12 is braked by the joint action of the locomotive 16 and brakes incorporated in the bogies 22. Braking may be achieved by regenerative braking by converting a large part of the kinetic energy of the carriage and locomotive unit, and also that of the aeroplane into electrical energy, in particular using the motors of the drive means in generator mode. Slowing of the aeroplane 64 is complete when the carriage reaches a predetermined taxiing speed. The locomotive 16 then moves the carriage 12 towards a parking zone, typically an aeroplane deboarding zone.

To park the aeroplane, the locomotive follows the rail track 14 through the points 62, hauling the carriage at taxiing speed as far as the parking zone 52. Taxiing speed is set so as to offer the best possible compromise between aeroplane occupant comfort and minimum maneuvering time.

Figure 6A:
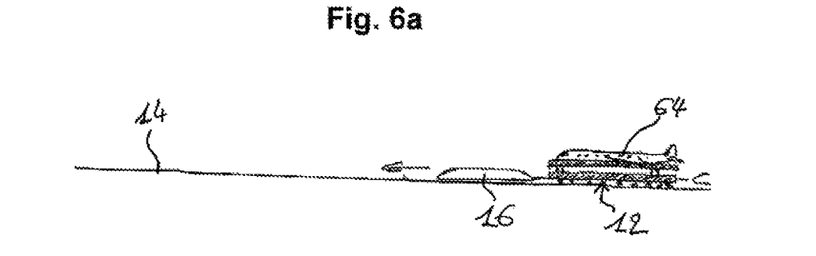
FIG. 6a is a side view of a step of a preferred embodiment of the ground assistance method for take off according to the disclosure comprising accelerating the carriage in a straight line up to a speed corresponding to the take off speed of the aeroplane.

To use the system 10 for take-off of an aeroplane 64, the locomotive 16 picks up the carriage 12 and the emergency vehicle 60 in a parking zone, typically a boarding zone, and transports them to the runway. The aeroplane 64 is held firmly on the platform 20, and the connection means 26 of the platform 20 are in the initial position as described above.

The locomotive 16 then accelerates the carriage 12 on the take-off runway in a straight line up to a predetermined take-off speed, as shown in FIG. 6a.

During the acceleration phase, the jet engines of the aeroplane may be activated so as to prepare to bring about take-off thrust. The actuators 40 of the connection means 26 may then be controlled to incline the aeroplane into a take-off position.

Figure 6B:
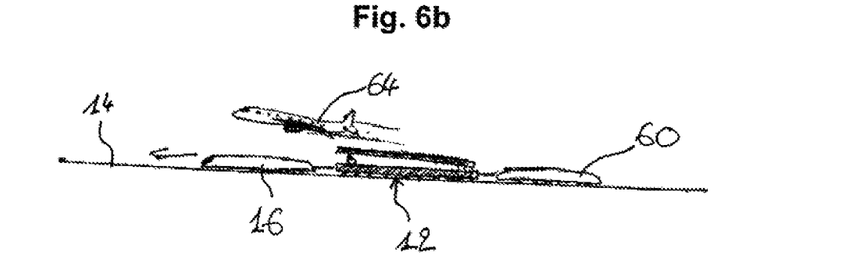
FIG. 6b is a side view of a step of the method of FIG. 5a comprising releasing the aeroplane using the coupling means once the take off speed has been reached.

When the predetermined take-off speed is reached, the coupling means 50 of the platform 20 are activated to release the aeroplane landing gear and the thrust of the jet engines may be freely exerted on the aeroplane 64 to cause take-off of the aeroplane 64, as shown in FIG. 6b.

As a safety measure, the carriage 12 continues at the speed of the aeroplane 64 so as to follow it over an additional distance. In case of take-off failure, the platform may thus re-engage the aeroplane in a similar manner to a landing procedure.

Once the aeroplane 64 is sufficiently far from the runway, the locomotive 16 and the carriage 12 brake to return to taxiing speed, and the connection means 26 between the platform 20 and the chassis 18 of the carriage 12 are returned to their initial position.

It is noted that, within the space corresponding to the airport, the aeroplane is always carried by a carriage. The creation of adapted aeroplanes without landing gear is thus readily conceivable.

The invention claimed is:

1. A ground maneuver assistance system for aircraft, more particularly for aeroplanes, said system comprising:
   a carriage driven on a runway by a drive means, a speed of which may be adapted to a landing or take off speed of the aeroplane,
   the carriage comprising a chassis configured to move on the runway;
   a mobile platform configured to support the aeroplane, the platform comprising coupling means configured to engage and release the aeroplane;
   and means for connecting the platform to the chassis, configured to create relative movement between the platform and the chassis;
   in which the connection means enable translational maneuvering of the platform, in at least one vertical direction and one transverse direction relative to the travel of the carriage;
   and in which the connection means also allow rotation of the platform in space along three perpendicular axes of rotation, so as to orient the platform in a plane corresponding to the take off or landing angle of the aeroplane.

2. The ground maneuver assistance system as claimed in claim 1, in which the carriage is connected removably to the drive means.

3. The ground maneuver assistance system as claimed in claim 2, in which the drive means comprise an electric locomotive which pushes or hauls the carriage.

4. The ground maneuver assistance system as claimed in claim 1, in which the system further comprises rails installed on the runway, and the chassis of the carriage is configured to travels on the rails.

5. The ground maneuver assistance system as claimed in claim 1, in which the carriage is driven by magnetic induction.

6. The ground maneuver assistance system as claimed in claim 1, in which the connection means comprise at least one onboard rail, and a system allowing the platform to be transported on the rail, translationally in a transverse direction relative to the travel of the carriage.

7. The ground maneuver assistance system as claimed in claim 1, in which the connection means comprise at least three hydraulic or pneumatic actuators connected to the platform at three separate points and allowing rotational orientation of the platform.

8. The ground maneuver assistance system as claimed in claim 1, in which the connection means comprise a horizontal slewing bearing which permits rotation of the platform about a vertical axis.

9. The ground maneuver assistance system as claimed in claim 1, in which the connection means comprise a vertical transmission shaft connected to the platform by a ball joint coupling, which enables vertical translational motion of the platform.

10. The ground maneuver assistance system as claimed in claim 1, in which the connection means comprise one or more shock-absorbing means.

11. The ground maneuver assistance system as claimed in claim 1, in which the coupling means are arranged for engaging and releasing the landing gear of the aeroplane and/or an aeroplane fuselage component.

12. The ground maneuver assistance system as claimed in claim 1, in which the system further comprises an emergency vehicle which transports assistance tools in the event of an aeroplane accident or fire.

13. The ground maneuver assistance system as claimed in claim 1, in which the carriage further comprises means of supplying electrical energy to the aircraft.

14. The ground maneuver assistance system as claimed in claim 1, in which the system further comprises a control module which can be controlled remotely to maneuver the carriage and/or orient the platform.

15. The ground maneuver assistance system as claimed in claim 1, in which the system is arranged for transporting the aeroplane to and from a parked position.

16. A ground assistance method for landing an aircraft, more particularly an aeroplane, having a system as claimed in claim 1, the method comprising the steps of:

placing the carriage at an end of the runway with the connection means in the initial position with the platform horizontal;

accelerating the carriage in a straight line up to a speed corresponding to the landing speed of the aeroplane;

matching the carriage's speed to that of the aeroplane;

controlling the connection means so as to maneuver the platform under the aeroplane;

controlling the connection means so as to bring the coupling means into contact with the corresponding components of the aeroplane;

engaging the aeroplane with the coupling means;

controlling the connection means in the initial position, so as to place the aeroplane on a horizontal plane;

braking the aeroplane down to a taxiing speed on the runway.

17. The ground assistance method for landing an aircraft, as claimed in claim 16, the method further comprising the step of:

once the aeroplane has been braked down to the taxiing speed on the runway, parking the aeroplane by driving the carriage at the taxiing speed as far as a parking zone.

18. A ground assistance method for take off of an aircraft, more particularly an aeroplane, having a system as claimed in claim 1, the method comprising the steps of:

placing the carriage at an end of the runway with the connection means in the initial position, with the platform horizontal, and the aeroplane fixed to the coupling means;

accelerating the carriage in a straight line up to a speed corresponding to the take off speed of the aeroplane;

controlling the connection means so as to incline the aeroplane into the take off position;

once the take off speed has been reached, releasing the aeroplane using the coupling means.

19. The ground assistance method for take off of an aircraft, as claimed in claim 18, the method further comprising the step of:

after take off of the aeroplane, continuing to maneuver the carriage under the aeroplane so as to be able to carry out landing in case of emergency.

* * * * *